United States Patent
Koep et al.

(10) Patent No.: US 11,247,938 B2
(45) Date of Patent: Feb. 15, 2022

(54) EMULSION COMPOSITIONS AND METHODS FOR STRENGTHENING GLASS

(71) Applicant: C-Bond Systems, LLC, Houston, TX (US)

(72) Inventors: Erik K. Koep, Houston, TX (US);
Vince Pugliese, Southlake, TX (US);
Bruce E. Rich, Houston, TX (US);
Andrew R. Barron, Swansea (GB)

(73) Assignee: C-Bond Systems, LLC, Houston, TX (US)

( * ) Notice: Subject to any disclaimer, the term of this patent is extended or adjusted under 35 U.S.C. 154(b) by 0 days.

(21) Appl. No.: 16/003,872

(22) Filed: Jun. 8, 2018

(65) Prior Publication Data
US 2018/0354846 A1    Dec. 13, 2018

Related U.S. Application Data (60) Provisional application No. 62/517,908, filed on Jun. 10, 2017.

(51) Int. Cl.
*C03C 17/00* (2006.01)
*C03C 17/32* (2006.01)
(Continued)

(52) U.S. Cl.
CPC .......... *C03C 17/328* (2013.01); *C03C 17/002* (2013.01); *C03C 17/005* (2013.01); *C03C 17/006* (2013.01); *C09D 5/022* (2013.01); *C09D 5/025* (2013.01); *C09D 7/63* (2018.01); *C09D 133/06* (2013.01); *C03C 2217/20* (2013.01); *C03C 2217/78* (2013.01);
(Continued)

(58) Field of Classification Search
None
See application file for complete search history.

(56) References Cited

U.S. PATENT DOCUMENTS

| | | | | |
|---|---|---|---|---|
| 4,340,524 A | * | 7/1982 | Bullman | ............... C08K 5/544 |
| | | | | 524/297 |
| 4,636,411 A | | 1/1987 | Bubois et al. | |

(Continued)

FOREIGN PATENT DOCUMENTS

| JP | 04296311 A | * | 10/1992 |
|---|---|---|---|
| WO | WO-2015063701 A | * | 5/2015 |

OTHER PUBLICATIONS

K. A. DeFriend and A. R. Barron, Surface repair of porous and damaged alumina bodies using carboxylate-alumoxane nanoparticles, J. Mater. Sci., 2002, 37, 2909-2916.

(Continued)

*Primary Examiner* — Jose I Hernandez-Kenney
(74) *Attorney, Agent, or Firm* — Stroock & Stroock & Lavan LLP (57) ABSTRACT

The present invention provides, in various embodiments, compositions and methods for strengthening glass without heat or chemical processing of the glass itself. The compositions of the present invention are emulsions comprising polymer colloid particles that are functionalized with an organosilicon compound. The polymer colloid particles can fill surface defects in the glass due to their size being smaller than the surface defects, and the functional groups thereon can react with the surface of the glass to anchor the particles in the defects.

15 Claims, 1 Drawing Sheet

(51) Int. Cl.
*C09D 5/02* (2006.01)
*C09D 7/63* (2018.01)
*C09D 133/06* (2006.01)
*C08K 5/09* (2006.01)

(52) U.S. Cl.
CPC .... *C03C 2218/112* (2013.01); *C03C 2218/32* (2013.01); *C08K 5/09* (2013.01)

(56) References Cited

U.S. PATENT DOCUMENTS

| | | | |
|---|---|---|---|
| 5,266,715 A * | 11/1993 | Harisiades | B32B 17/10018 |
| | | | 556/419 |
| 5,292,844 A | 3/1994 | Young et al. | |
| 5,567,235 A | 10/1996 | Carson et al. | |
| 5,846,454 A * | 12/1998 | Koczo | B01D 19/0409 |
| | | | 516/11 |
| 6,001,907 A * | 12/1999 | Huang | C08K 5/5435 |
| | | | 524/114 |
| 6,210,750 B1 | 4/2001 | Cho et al. | |
| 6,248,855 B1 * | 6/2001 | Dalle | A61K 8/062 |
| | | | 516/53 |
| 7,968,039 B2 | 6/2011 | Tsuda et al. | |
| 8,685,535 B2 | 4/2014 | Niimi et al. | |
| 8,722,185 B2 | 5/2014 | Niwa et al. | |
| 8,962,136 B2 | 2/2015 | Takahira et al. | |
| 9,011,995 B2 | 4/2015 | Park et al. | |
| 9,012,549 B2 | 4/2015 | Tanaka et al. | |
| 9,499,434 B1 | 11/2016 | Sharma et al. | |
| 9,505,654 B2 | 11/2016 | Sklyarevich et al. | |
| 2003/0199611 A1 * | 10/2003 | Chandrasekaran | D06P 5/30 |
| | | | 523/160 |
| 2008/0199618 A1 | 8/2008 | Wen et al. | |
| 2009/0305058 A1 | 12/2009 | Marumoto | |
| 2010/0233146 A1 * | 9/2010 | McDaniel | C09D 5/14 |
| | | | 424/94.2 |
| 2011/0217558 A1 | 9/2011 | Brogan et al. | |
| 2012/0085482 A1 | 4/2012 | Cadwallander et al. | |
| 2013/0299378 A1 | 11/2013 | Sharma et al. | |
| 2014/0037951 A1 | 2/2014 | Shigetomi et al. | |
| 2014/0141260 A1 | 5/2014 | Henry | |
| 2014/0308452 A1 | 10/2014 | Schumann et al. | |
| 2014/0315018 A1 | 10/2014 | Yamagata et al. | |
| 2016/0046823 A1 * | 2/2016 | Barrera | C08K 5/053 |
| | | | 524/161 |
| 2016/0251536 A1 | 9/2016 | Brogan | |

OTHER PUBLICATIONS

Chen Z, Shen Y, Bao W, Li P, Wang X, Ding Z. Identification of surface defects on glass by parallel spectral domain optical coherence tomography. Opt Express. 2015, 23, 23634-23646. DOI:10.1364/OE.23.023634.

International Search Report and Written Opinion dated Sep. 7, 2018 in International Application No. PCT/US2018/036912.

* cited by examiner

EMULSION COMPOSITIONS AND METHODS FOR STRENGTHENING GLASS

RELATED APPLICATIONS

This application claims the benefit of U.S. Provisional Application No. 62/517,908, filed Jun. 10, 2017, the contents of which are incorporated by reference herein in their entirety.

BACKGROUND

The fracture toughness of glass can be improved through the judicious use of heat. Well-understood mechanisms of glass toughening, such as annealing and tempering, can be effective, but add cost and may not be applicable to all glass and brittle material applications. Moreover, thermal or ion-exchange mechanisms cannot be retrofitted for aftermarket applications.

SUMMARY

The present invention provides, in various embodiments, compositions and methods to enhance the properties of glass, and specifically to improve properties such as strength, impact resistance, sustainability, protection level, and/or structural integrity. The disclosure herein refers primarily to the strengthening of glass (e.g., flat glass, bottling, display glass, architectural glass), but the compositions and methods of the present invention can be applied more broadly to other brittle materials (e.g., dense ceramics, porcelain, paint, laminates). The present invention imparts additional fracture toughness to brittle materials without the use of heat treatment and therefore can be applied after manufacture is complete.

In some embodiments, the invention provides a composition for strengthening glass comprising: a bi-functional organosilicon compound; a dispersible polymer; a polyol; and an aqueous solvent, wherein the composition is a colloidal suspension, wherein a first functional group of the bi-functional organosilicon compound is adapted to react with the dispersible polymer to form a plurality of functionalized polymer colloid particles, wherein a second functional group of the bi-functional organosilicon compound is adapted to react with a surface of the glass to anchor the functionalized polymer colloid particles thereto, and wherein the functionalized polymer colloid particles have an average diameter of about 5 nm to about 5000 nm as measured by dynamic light scattering (DLS).

In some embodiments, the bi-functional organosilicon compound is an alkoxysilane.

In some embodiments, the alkoxysilane is (3-glycidoxypropyl)trimethoxysilane, (3-aminopropyl)trimethoxysilane, or (3-glycidoxypropyl)methyldiethoxysilane.

In some embodiments, the dispersible polymer is an acrylic polymer.

In some embodiments, the polyol is glycerol.

In some embodiments, the composition further comprises a defoamer.

In some embodiments, the composition further comprises polypropylene glycol.

In some embodiments, the solvent comprises a mixture of water and an alcohol. In some embodiments, the alcohol is isopropyl alcohol.

In some embodiments, the composition further comprises a carboxylic acid as a preservative. In some embodiments, the carboxylic acid is benzoic acid.

In some embodiments, the functionalized polymer colloid particles have an average diameter of about 5 nm to about 3000 nm as measured by DLS.

In some embodiments, the functionalized polymer colloid particles have an average diameter of about 200 nm to about 800 nm as measured by DLS.

In some embodiments, the invention provides a method for strengthening glass, comprising treating a glass surface having one or more defects thereon with a composition comprising: a bi-functional organosilicon compound; a dispersible polymer; a polyol; and an aqueous solvent, wherein the composition is a colloidal suspension, wherein a first functional group of the bi-functional organosilicon compound is adapted to react with the dispersible polymer to form a plurality of functionalized polymer colloid particles, wherein a second functional group of the bi-functional organosilicon compound is adapted to react with a surface of the glass to anchor the functionalized polymer colloid particles thereto, and wherein the functionalized polymer colloid particles have an average diameter of about 5 nm to about 5000 nm as measured by dynamic light scattering (DLS). The method comprises treating the glass surface with the composition by spreading, spraying, dipping, spin coating, casting, roll coating, extrusion coating, knife coating, thermal spraying, web coating, or electrophoresis; and evaporating the solvent to leave the functionalized polymer colloid particles in the defects on the glass.

In some embodiments, the evaporating comprises heating the treated glass with an external heat source. In some embodiments, the external heat source comprises an infrared heat source or an ultraviolet radiation heat source.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of the preferred embodiments of the application, will be better understood when read in conjunction with the appended drawings. For the purposes of illustrating the systems and methods of the present application, there are shown in the drawings preferred embodiments. It should be understood, however, that the application is not limited to the precise arrangements and instrumentalities shown. In the drawings.

DETAILED DESCRIPTION

Glass is potentially very strong; however, in sheet form the strength is reduced by the presence of invisibly small defects, known as Griffith cracks, which cause stress concentrations allowing cracks to propagate. Such defects can dramatically degrade glass quality. Strength may be reduced further by larger visible defects. The potential causes of breakage of annealed glass include uniform load, impact, edge damage, poor glazing, site damage, and thermal stress. These factors may also cause breakage of toughened glass, but the failure loads will be higher.

The most significant form of uniform loading on glass is normally wind load, although other causes such as snow may occur in some situations. The safe load on a pane of glass is related to the size of the pane and glass thickness. Glass may break as a result of impact. The impact may be accidental (e.g., from human collision) or deliberate (e.g., from vandalism). Breakage may also be caused by thrown or wind-borne projectiles (e.g., gravel blown from roofs).

Strengthened glass laminates were introduced in the early 1900s and are used today in safety and security glass applications. Impact-resistant glass laminates are used in buildings and in structures, and in automobile glass, for safety and security applications.

Toughened or tempered glass is a type of safety glass processed by controlled thermal or chemical treatments to increase its strength compared with normal glass. Tempering puts the outer surfaces into compression and the inner surfaces into tension. Such stresses cause the glass, when broken, to crumble into small granular chunks instead of splintering into jagged shards as plate glass (annealed glass) creates. The granular chunks are less likely to cause injury.

Toughened glass can be made from annealed glass via a thermal tempering process. The glass is placed onto a roller table, taking it through a furnace that heats it well above its transition temperature of 564° C. (1,047° F.) to around 620° C. (1,148° F.). The glass is then rapidly cooled with forced air drafts while the inner portion remains free to flow for a short time. An alternative chemical toughening process involves forcing a surface layer of glass at least 0.01 mm thick into compression by ion exchange of the sodium ions in the glass surface with potassium ions (which are 30% larger), by immersion of the glass into a bath of molten potassium nitrate. Chemical toughening results in increased toughness compared with thermal toughening and can be applied to glass objects of complex shapes.

Chemically-strengthened glass is a type of glass that has increased strength as a result of post-production chemical processing. When broken, it still shatters in long pointed splinters similar to float glass. However, chemically-strengthened glass is typically six to eight times the strength of float glass. The glass is chemically strengthened by a surface finishing process, in which the glass is submersed in a bath containing a potassium salt (typically potassium nitrate) at 300° C. (572° F.). This causes sodium ions in the glass surface to be replaced by potassium ions from the bath solution. These potassium ions are larger than the sodium ions and therefore wedge into the gaps left by the smaller sodium ions when they migrate to the potassium nitrate solution. This replacement of ions causes the surface of the glass to be in a state of compression and the core in compensating tension. The surface compression of chemically-strengthened glass may reach up to 690 MPa.

There also exists a more advanced, two-stage process for making chemically-strengthened glass, in which the glass article is first immersed in a sodium nitrate bath at 450° C. (842° F.), which enriches the surface with sodium ions. This leaves more sodium ions on the glass for the immersion in potassium nitrate to replace with potassium ions. In this way, the use of a sodium nitrate bath increases the potential for surface compression in the finished article.

Chemical strengthening results in a strengthening similar to toughened glass. However, the process does not use extreme variations of temperature and therefore chemically-strengthened glass has little or no bow or warp, optical distortion, or strain pattern. This differs from toughened glass, in which slender pieces can be significantly bowed. Unlike toughened glass, chemically-strengthened glass may be cut after strengthening, but loses its added strength within the region of approximately 20 mm of the cut. Similarly, when the surface of chemically-strengthened glass is deeply scratched, this area loses its additional strength.

Both chemical and thermal strengthening processing must be performed on the as-prepared glass pane. Once glass is installed, no in-situ treatment is possible.

Impact-resistant glass laminates have been constructed using alternating layers of glass and materials, such as plastic sheeting with adhesive interlays. Some known bullet-resistant glass is made with several glass sheets connected together with polyvinyl butyral sheets and with a polycarbonate layer bonded on an inside face of the final glass sheet using a thermoplastics polyurethane layer. The polycarbonate layer provides additional strength and, to a small degree, elasticity to the glass upon impact, and provides resistance to spalling. Alternating layers of glass and plastic can be cumbersome due to their size and weight.

Some innovations in safety and security glass laminates have focused on improving performance (i.e., impact resistance) while making glass laminates more lightweight, less bulky, and less expensive to produce in mass quantities.

Some known glass laminates have a polyester film, such as Mylar® film, applied to a single glass sheet to increase overall strength and bullet resistance of the glass. The polyester film is usually pre-coated with an adhesive, such as an acrylic resin, which permits the polyester film to be bonded to one side of a glass sheet by applying a mild pressure.

Various other methods to strengthen glass have been disclosed. For example, some prior methods involve exposing a selected area of the glass article to a beam of electromagnetic radiation in order to diffuse first alkali metal ions in the selected area out of the glass article and to diffuse second alkali metal ions on a surface of the glass article and in the selected area into the glass article. The second alkali metal ions are larger than the first alkali metal ions. Other prior methods involve treating glass with a solution including a silane, a solvent, a catalyst, and water, which reportedly provides a strength increase of about 5-10%.

The present invention overcomes the problems and shortcomings identified in the art, and provides, in various embodiments, compositions and methods that can be used to strengthen glass at any time, from glass production to post-installation, without the addition of laminate layers. Applications of the present invention include, but are not limited to, strengthening automotive glass, household glass, and commercial glass. Compositions of the present invention can provide, for example, an increase in strength of about 33% as compared to untreated glass.

In preferred embodiments, compositions of the present invention comprise an organosilicon compound, a polyol, a dispersible polymer, and a solvent. In some embodiments, compositions of the present invention may also include one or more carboxylic acids, surfactants, dispersants, rheology modifiers, emulsifiers, and/or emulsion stabilizers. These compositions form an emulsion wherein precise control of the emulsion droplet size can impact performance. In preferred embodiments, the emulsion is characterized by designed nanodroplets of controlled composition and droplet size within an aqueous medium. While the compositions form an emulsion, they can also, optionally, form a colloid. The compositions can comprise industrial, pharmaceutical, or food grade formulations.

A polymer is a large molecule, or macromolecule, composed of many repeated subunits. In the present invention, a dispersible polymer is a polymer that may be dispersed into a solvent to create a colloidal suspension. Examples of dispersible polymers include, but are not limited to, polypropylene glycol, vinyl acetate-ethylene and vinyl acetate-vinyl chloride-ethylene, and acrylic polymers such as poly (methyl methacrylate), sodium polyacrylate, and polyacrylamide. In some embodiments, the dispersible polymer may be an epoxy polymer, a urethane polymer, or a polysulfide.

Organosilicon compounds are compounds containing carbon-silicon bonds. They may also contain silicon to oxygen bonds, in which case they are also known as silicones. Examples of organosilicon compounds include, but are not limited to, polydimethylsiloxane, (3-glycidoxypropyl) trimethoxysilane, (3-aminopropyl)trimethoxysilane, and tetra-n-butoxysilane.

A polyol is an alcohol containing multiple hydroxyl groups. Examples of polyols include, but are not limited to, glycerin, pentaerythritol, ethylene glycol, and sucrose. In the present invention, the function of the polyol is to stabilize the organosilicon/polymer colloid. A further function of the polyol may be to bind the polymer colloid particles to each other during the cure process, and/or to aid in the evaporation process.

A colloid is a mixture or colloidal suspension in which one substance of microscopically-dispersed insoluble particles is suspended throughout another substance. It is not necessary for the insoluble particles to be of a solid. Sometimes the dispersed substance alone is called the colloid; the term colloidal suspension refers to the overall mixture. Unlike a solution, whose solute and solvent constitute only one phase, a colloid has a dispersed phase (the suspended particles) and a continuous phase (the medium of suspension). A colloidal suspension is sometimes referred to as a colloidal solution. Herein, the terms colloidal suspension and colloidal solution are considered synonymous.

Emulsion droplet size can be varied by altering the processing technique. Changes in the processing may involve changes in the addition times, the agitation times, the agitation method, the addition order, and/or the rate of addition. Distributions of the emulsion droplet may be mono-modal, bi-modal, or multi-modal. Emulsion droplet size may be measured by a variety of techniques, but typically dynamic light scattering (DLS) or single particle optical sizing are the preferred methods.

Emulsion droplet size may also be varied through judicious material choice. Alternatives to the polyol or the dispersible polymer may alter the ultimate emulsion size. Optional additions, such as surfactants, dispersants, rheology modifiers, emulsifiers, and/or emulsion stabilizers may also alter the final emulsion size. In some embodiments, compositions of the present invention may include a surfactant such as an alcohol alkoxylate, a sodium salt, or a fluorosurfactant. In other embodiments, compositions of the present invention may be substantially free of surfactant.

Concentration of the active ingredients in the emulsion may also be changed. The compositions of the present invention can be greater than or equal to 51% water, but preferably greater than 85% water. For example, a comparison of Examples 1 and 16 (detailed below) shows that a range of concentrations can provide similar results. The relative ratios of organosilicon to polyol may be varied, for example, such that the molar ratio of organosilicon to polyol is greater than 1:3, but no more than 5:1.

In preferred embodiments, compositions of the present invention can yield significantly improved fracture toughness by matching the emulsion concentration and droplet size distribution to the flaw concentration and size distribution within the underlying material. When colloidal particles within the solution are sufficiently small, they can penetrate surface flaws and approach the crack tip.

Figure 1:
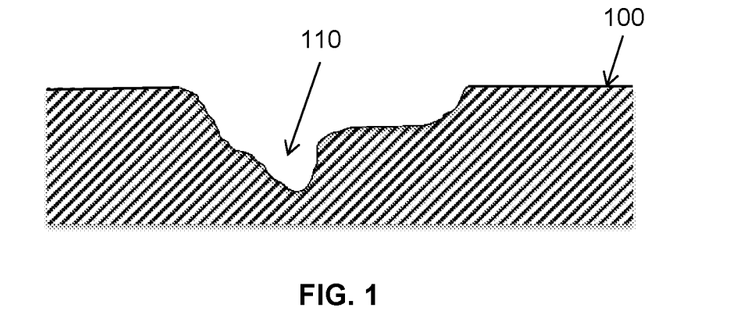
FIG. 1 is a schematic cross-sectional view of surface defects in a glass pane.
Figure 2:
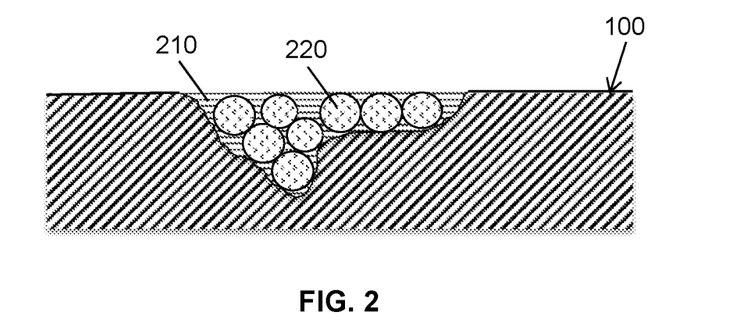
FIG. 2 is a schematic cross-sectional view showing colloidal particles incorporated into the surface defects in the glass pane by capillary forces of the solvent.

The present invention provides compositions and methods for strengthening glass without heat or chemical processing of the glass itself. See, for example, FIG. 1, which shows a schematic of surface defects 110 viewed in the cross section of a glass pane 100, and FIG. 2, which shows colloidal particles 220 incorporated into the surface defects in the glass pane by capillary forces of the solvent 210. In preferred embodiments, the surface of the glass is treated with a colloidal suspension designed to infiltrate the cracks and micro defects in the surface of the glass. The composition of the colloid is designed to consist of particles whose sizes are smaller or comparable to the defects on the glass. The strengthening of the glass occurs due to the filling in of the cracks and defects. The advantage of using a colloid solution is that the colloidal particles can efficiently fill the defects and micro cracks in the glass due to their appropriate size rather than layer by layer as would occur with a non-colloidal treatment or a similar chemical composition without being a colloid. In some embodiments, compositions of the present invention can use colloidal particles in a range of sizes to allow for efficient filling of surface defects.

Figure 3:
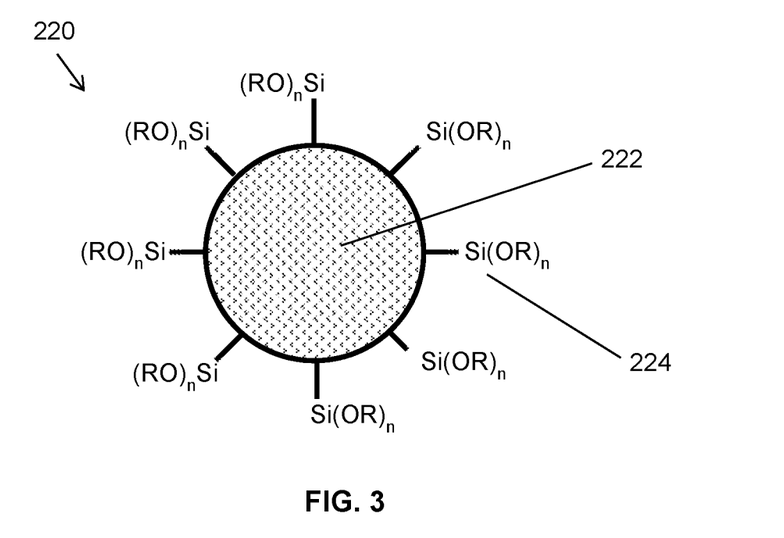
FIG. 3 is a schematic of an exemplary colloidal particle composition showing the polymer and the organosilicon functionality.

In preferred embodiments, compositions of the present invention include a bi-functional silane component, where one of the functional groups or substituents is chosen to react with or be incorporated into the colloidal particle, and the second functional group is chosen in order to react with the surface of the defect or crack within the glass once the colloidal particle has infiltrated into the crack or defect. See, for example, FIG. 3, which shows a schematic of an exemplary colloidal particle composition 220 showing the polymer 222 and the organosilicon functionality 224. Compositions of the present invention can fill the surface defects and use the silane as an anchor between the polymer colloid particles and the glass defect surface, instead of merely creating a silica coating. The reactive nature of the surface of the preformed colloidal particles 220 means that the reaction with the surface of the crack or defect is more efficient.

In preferred embodiments, compositions of the present invention do not include nanoparticles such as carbon nanotubes to provide the strengthening of glass. Instead, the strengthening is provided by the creation of a colloidal suspension substantially free of carbon nanotubes or other nanoparticles, wherein the surface of the colloid is reactive with the glass, and the colloid fills the cracks and defects. Exemplary nanoparticles that are specifically excluded in compositions of the present invention include, but are not limited to: carbon nanotubes of all types, including single-walled carbon nanotubes (SWNT), double-walled carbon nanotubes (DWNT), multi-walled carbon nanotubes (MWNT), and XDCNT (a mixture of various carbon nanotube types), boron nitride nanotubes, graphene, graphene oxide, graphene as flakes or ribbons, 2-D nanoparticles, hexagonal boron nitride as flakes or ribbons, calcium carbonate, boron-silicate, alumina, silica, Polyhedral Oligomeric Silsesquioxane (POSS), nanoclays, and other ceramic and inorganic nanoparticles and other nano-scale modifiers (e.g., ceramic nanoparticles that are Color Centers or F-Center materials on a nano- to micro-scale and enable color change), and/or mixtures thereof.

In preferred embodiments, compositions of the present invention include a dispersible polymer that is formed into a colloidal suspension through physical manipulation such as stirring or sonication. The size of the colloidal particles may be controlled through choice of reagents, choice of reagent ratio, solution concentration, and/or mixing technique. The addition of an organosilicon compound combined with a polyol is used both to create a stabilized colloid and to provide the surface of the colloid particle with groups that are able to react with the surface of the glass during the cure time.

The importance of the formation of a colloidal solutions, as opposed to a mixture of the claimed components, is demonstrated by a comparison between Examples 1 and 17 (detailed below). If solutions of identical chemical composition are prepared without the formation of a colloid, there is a significant difference in the increased strength that can be obtained. Thus, no colloid results in an increase over untreated glass of 2.3%, while using the same composition but with the formation of a colloid results in an increase in strength of 8.7%. This comparison confirms that the presence of the colloid is important.

In the present invention, the term cure is used to denote a process of evaporation of solvent and binding of the colloid particles to the interior of the defects within the glass surface. Cure is not intended to designate a process whereby a material hardens from a liquid or particulate state to a solid with inherent strength such as observed for resins and adhesives.

The process of the invention involves the infiltration of polymer colloid particles into the cracks and defects within the glass surface by capillary action. Once these polymer colloid particles are in place, the silane functionality enables their reaction with the surface of the defect of the glass. Thus, during the cure process the solvent is evaporated and the resulting colloid polymer particles react with the surface of the glass, both physically filling the crack or defect and also providing chemical bonding.

A summary of the Examples described below, and the effect of various composition and process changes made in the Examples, is given in Table 1.

TABLE 1

| Example | Composition/process changes as compared to baseline solution | Improvement over untreated | Comment |
| --- | --- | --- | --- |
| 1 | Baseline solution | 8.7% | Colloid formation |
| 2 | GPTMS replaced with polydimethylsiloxane | −1.9% | Due to non-reactive polydimethylsiloxane not creating a bond to the glass or colloid |
| 3 | Glycerol replaced with propylene glycol | −8.2% | No colloid formation due to poor mixing |
| 4 | GPTMS replaced with (3-glycidoxypropyl)methyldiethoxysilane | 22.5% | Stable colloid formation |
| 5 | GPTMS replaced with (3-aminopropyl)trimethoxysilane | 14.0% | Stable colloid formation |
| 6 | GPTMS replaced with tetra-n-butoxysilane | 0.4% | Due to tetra-n-butoxysilane not creating a bond to the glass and forming silica particles |
| 7 | Glycerol replaced with propanediol | 6.0% | Colloid formation |
| 8 | Defoamer removed | 29.4% | Stable colloid formation |
| 9 | Defoamer replaced with propylene glycol | 2.5% | No colloid formation due to poor mixing |
| 10 | Defoamer homogenized prior to addition | 14.9% | Enhanced colloid formation |
| 11 | Defoamer replaced with 425 molecular weight polypropylene glycol | 25.6% | Stable colloid formation |
| 12 | Defoamer replaced with 1200 molecular weight polypropylene glycol | 13.4% | Stable colloid formation |
| 13 | Polymer replaced with Butvar ® B-79 | 5.2% | Butvar solidified precluded colloid formation |
| 14 | Defoamer replaced with 1200 molecular weight polypropylene glycol pre-homogenized | 12.4% | Stable colloid formation |
| 15 | Defoamer replaced with 425 molecular weight polypropylene glycol pre-homogenized | 7.0% | Colloid poorly formed |
| 16 | Glycerol, GPTMS, and EC-1791 concentrations increased | 5.8% | Higher concentration does not improve performance |
| 17 | No mixing | 2.3% | No colloid formation |

The importance of colloid formation is demonstrated by the comparison of Examples 1 and 17 in which no mixing is used for the latter, which precludes colloid formation and results in little to no improvement in strengthening of glass.

The colloid particle size can be determined by DLS measurement; however, no particle size is determined for homogeneous solutions.

Furthermore, if glycerol is replaced with propylene glycol (Example 3) then the increase in viscosity limits colloid formation and results in no strengthening of the glass.

The importance of the composition is creating a stable colloid is shown by comparison of Examples 1 and 9 where the defoamer is replaced with propylene glycol and the resulting strengthening is reduced from 8.7% to 2.5%. However, increasing the molecular weight by the use of polypropylene glycol with a molecular weight of 425 g/mol (Example 11) results in a dramatic improvement in glass strengthening due to the formation of a stable colloid. By contrast, further increasing the molecular weight of the polypropylene glycol to 1200 g/mol (Example 12) does not provide as much improvement due to the difficulties in mixing from the higher molecular weight.

The importance of a reactive silane species is shown by comparison of Example 1 and either Example 2 or 6 in which the reactive GPTMS replaced with polydimethylsiloxane or tetra-n-butoxysilane. Polydimethylsiloxane is an unreactive silane and therefore does not react with either the colloid or the glass. In contrast, tetra-n-butoxysilane can react with the surface of the glass, but not with the polymer colloid particle. Thus, the GPTMS or equivalent species is chosen for its bi-functional structure that allows reaction with both the surface of the defect in the glass and the surface of the colloidal particle. This is therefore a linker unit.

Other suitable linkage units include, for example, 3-aminopropyl trimethoxysilane (Example 5) and (3-glycidoxypropyl)methyldiethoxysilane (Example 4). Both of these provide a functional group that reacts with the polymer colloid (i.e., the amino group or the 3-glycidoxypropyl group). In addition, the ethoxysilane functional group reacts with the defect surface of the glass to link the colloid to the defect.

In some embodiments, a composition according to the present invention is applied onto a layer of glass, onto one or both surfaces of the glass, and/or onto surfaces of multiple layers of glass that are then combined one onto the other, with composition between adjacent layers. Excess composition material may be removed. In certain aspects, sufficient material is used so that material penetrates pores of a layer of material (such as, but not limited to, pores in a pane or layer of glass) and remains in and/or fills the pores. In certain embodiments, the composition after drying is between about 0.01 microns and about 10 microns thick.

In other embodiments, a multi-layer glass structure is produced in which any surface or surfaces of any particular glass layer has a coating of a composition according to the present invention, and, in one particular embodiment, there is a coating of the composition between each two adjacent glass layers, with or without such a coating on one or both outermost surfaces of the structure. In any such embodiment, sufficient composition material may be used so that pores of the material are filled in.

EXAMPLES

Example 1

In Step 1, 1 gallon (3.785 L) of distilled water was stirred at a stirring speed of 8 for 2 minutes until a vortex formed and stabilized. To this, 1.86 g of benzoic acid was added as a preservative. The solution was stirred for an additional 3 hours to ensure complete dissolution of the preservative. In Step 2, 7.5 mL of glycerol was added to the solution while stirring at a stir setting of 6.5. The solution with glycerol addition was stirred for 5 minutes to allow the glycerol to completely dissolve. 24 mL of (3-glycidoxypropyl) trimethoxysilane (GPTMS) was then added to the solution, also while stirring at a stir setting of 6.5. The solution was again allowed to stir for an additional 5 minutes in order to fully dissolve the GPTMS. The stirrer was then stopped and the solution was allowed to stand for 24 hours. After 24 hours, the stirrer was restarted to a stir setting of 6.5. In Step 3, the solution was stirred for 2 minutes to allow a vortex to form and stabilize. 2 mL of isopropyl alcohol was added to the solution and stirred for 2 minutes to fully dissolve. Next, 20 mL of defoamer, in this case New London C-2245 (a water-based, biodegradable, non-silicone defoaming blend), was added to the solution while stirring. The solution was stirred for 2 minutes to allow the defoamer to completely dissolve in solution. Finally, 0.32 g of dispersible polymer, in this case Dow RHOPLEX™ EC-1791 acrylic polymer, was added to the solution while stirring. The solution was allowed to stir an additional 5 minutes at a stir setting of 6.5. Upon completion of this step, the solution was packaged and considered ready for testing.

Testing was performed by first spray coating light bulbs (Halco 60W A19) with solution and setting aside to dry. Bulbs were allowed to dry for 7 days at ambient temperature and humidity. Following drying, both coated and control bulbs were tested for impact strength by dropping at increasing heights onto a load cell (Loadstar Sensors, LV-1000HS) until failure. The highest recorded impact force was taken as the value for each bulb. 4-8 bulbs were tested for each solution so as to ensure reliable results. Control bulbs broke at an average impact force of 25.2 ft-lb. Bulbs coated with solution from Example 1 failed at an impact force of 27.4 ft-lb, for an improvement over untreated of 8.7%. The average particle size as determined by dynamic light scattering (DLS) was 2844 nm with a polydispersity of 0.309.

Example 2

In this embodiment, a solution was prepared as in Example 1, except that the entire quantity of GPTMS (24 mL) was replaced with 102 mL of non-reactive polydimethylsiloxane. All stirring times remained the same. The solution prepared in Example 2 failed at an impact force of 24.7 ft-lb, for an improvement over untreated of −1.9%.

Example 3

In this embodiment, a solution was prepared as in Example 1, except that the entire quantity of glycerol (7.5 mL) was replaced with 7.3 mL of propylene glycol. This solution did not mix well and despite additional stirring time added did not result in a stable colloid. After the addition of GPTMS in Step 2, the solution was stirred for an additional 25 minutes, for a total of 30 minutes. The solution prepared in Example 3 failed at an impact force of 23.1 ft-lb, for an improvement over untreated of −8.2%.

Example 4

In this embodiment, a solution was prepared as in Example 1, except that the entire quantity of GPTMS (24 mL) was replaced with 28 mL of (3-glycidoxypropyl)methyldiethoxysilane. This solution showed a noticeably higher viscosity. After the addition of (3-glycidoxypropyl)methyldiethoxysilane in Step 2, the solution was stirred for an additional 25 minutes, for a total of 30 minutes. The solution prepared in Example 4 failed at an impact force of 30.9 ft-lb, for an improvement over untreated of 22.5%. The average particle size as determined by dynamic light scattering (DLS) was 680 nm with a polydispersity of 0.349.

Example 5

In this embodiment, a solution was prepared as in Example 1, except that the entire quantity of GPTMS (24 mL) was replaced with 19 mL of 3-aminopropyltrimethoxysilane. This solution mixed well and all mixing times were held constant. The solution prepared in Example 5 failed at an impact force of 28.75 ft-lb, for an improvement over untreated of 14.0%. The average particle size as determined by dynamic light scattering (DLS) was 496 nm with a polydispersity of 0.153.

Example 6

In this embodiment, a solution was prepared as in Example 1, except that the entire quantity of GPTMS (24 mL) was replaced with 39 mL of tetra-n-butoxysilane. This solution mixed well and all mixing times were held constant. The solution prepared in Example 6 failed at an impact force of 25.3 ft-lb, for an improvement over untreated of 0.4%.

Example 7

In this embodiment, a solution was prepared as in Example 1, except that the entire quantity of glycerol (7.5 mL) was replaced with 8 mL of propanediol. This solution mixed well and all mixing times were held constant. The solution prepared in Example 7 failed at an impact force of 26.7 ft-lb, for an improvement over untreated of 6.0%.

Example 8

In this embodiment, a solution was prepared as in Example 1, except that the entire quantity of the defoamer (20 mL of C-2245) was removed. This solution mixed well and was noticeably clear. The solution prepared in Example 8 failed at an impact force of 32.6 ft-lb, for an improvement over untreated of 29.4%. The average particle size as determined by dynamic light scattering (DLS) was 399 nm with a polydispersity of 0.043.

Example 9

In this embodiment, a solution was prepared as in Example 1, except that the entire quantity of the defoamer (20 mL of C-2245) was replaced with 20 mL of propylene glycol. This solution mixed well and all mixing times were held constant. The solution prepared in Example 9 failed at an impact force of 25.8 ft-lb, for an improvement over untreated of 2.5%.

Example 10

In this embodiment, a solution was prepared as in Example 1, except that the entire quantity of defoamer (20 mL of C-2245) was homogenized prior to addition to solution. Homogenization was performed by mixing with an IKA T-25 Homogenizer for 15 minutes at a velocity of 8500 revolutions per minute. Upon addition of the defoamer, the solution mixed well and all mixing times were held constant. The solution prepared in Example 10 failed at an impact force of 28.9 ft-lb, for an improvement over untreated of 14.9%. The average particle size as determined by dynamic light scattering (DLS) was 390 nm with a polydispersity of 0.087.

Example 11

In this embodiment, a solution was prepared as in Example 1, except that the entire quantity of defoamer (20 mL of C-2245) was replaced with 20 mL of 425 molecular weight polypropylene glycol. This solution mixed well and all mixing times were held constant. The solution prepared in Example 11 failed at an impact force of 31.7 ft-lb, for an improvement over untreated of 25.6%. The average particle size as determined by dynamic light scattering (DLS) was 237 nm with a polydispersity of 0.129.

Example 12

In this embodiment, a solution was prepared as in Example 1, except that the entire quantity of defoamer (20 mL of C-2245) was replaced with 20 mL of 1200 molecular weight polypropylene glycol. This solution mixed well and all mixing times were held constant. The solution prepared in Example 12 failed at an impact force of 28.6 ft-lb, for an improvement over untreated of 13.4%.

Example 13

In this embodiment, a solution was prepared as in Example 1, except that the entire quantity of polymer (0.32 g of EC-1791) was replaced with 0.32 g of Butvar® B-79 polyvinyl butyral (PVB) resin. In this experiment, the Butvar® B-79 solidified completely in contact with water and did not go into solution. The solution prepared in Example 13 failed at an impact force of 26.8 ft-lb, for an improvement over untreated of 5.2%.

Example 14

In this embodiment, a solution was prepared as in Example 1, except that the entire quantity of defoamer (20 mL of C-2245) was replaced with 20 mL of 1200 molecular weight polypropylene glycol. In this experiment, the 1200 MW PPG was homogenized prior to addition to the solution. Homogenization was performed by mixing with an IKA T-25 Homogenizer for 15 minutes at a velocity of 8500 revolutions per minute. Upon addition of the defoamer, the solution mixed well and all mixing times were held constant. The solution prepared in Example 14 failed at an impact force of 28.4 ft-lb, for an improvement over untreated of 12.4%.

Example 15

In this embodiment, a solution was prepared as in Example 1, except that the entire quantity of defoamer (20 mL of C-2245) was replaced with 20 mL of 425 molecular weight polypropylene glycol. In this experiment, the 425 MW PPG was homogenized prior to addition to the solution. Homogenization was performed by mixing with an IKA T-25 Homogenizer for 15 minutes at a velocity of 8500 revolutions per minute. Upon addition of the defoamer, the solution mixed well and all mixing times were held constant.

The solution prepared in Example 15 failed at an impact force of 26.9 ft-lb, for an improvement over untreated of 7.0%.

Example 16

In this embodiment, a solution was prepared as in Example 1, except that the addition of glycerol was increased to 15 mL, the addition of GPTMS was increased to 125 mL and the addition of EC-1791 was increased to 1.62 g. This solution mixed well and all mixing times were held constant. The solution prepared in Example 15 failed at an impact force of 26.6 ft-lb, for an improvement over untreated of 5.8%.

Example 17

In this embodiment, a solution was prepared as in Example 1, except that the mixing and hold periods were removed. This was chosen to demonstrate the importance of the formation of a colloid rather than the reagents. Precursor components were added to the water and lightly stirred to ensure integration, but not sufficiently mixed to impact colloid size. The solution prepared in Example 17 failed at an impact force of 25.75 ft-lb, for an improvement over untreated of 2.3%. With ring on ring strength testing, this solution showed an improvement over untreated of −3.03%. Dynamic light scattering (DLS) could not determine a particle size, indicating that no colloid particles were formed.

Example 18

Evaluation of two solutions was also performed by ring on ring strength testing. 3"×3" glass samples from Lone Star Glass Inc. were sprayed with solution on both sides and allowed to dry. To speed up complete drying, samples were placed in a drying oven at 250° F. for 90 minutes. Once the samples were dried, they were removed from the drying oven and allowed to return to room temperature. For ring on ring testing, the dimensions of each sample were measured and entered into the MTestQuattro® software. The samples were then mounted on silica pads and covered with adhesive tape from Saint-Gobain. The pads and the tape protect the equipment from scratching, eliminate contact stresses and friction between the rings and the glass, and keep the broken glass from flying off when the sample shatters. The untreated glass failed at an impact force of 105.4 ft-lb with a standard deviation of 25.1 ft-lb.

A first solution was prepared as in Example 8, which was substantially free of defoamer. The ring on ring test gave a result of 140.9 ft-lb with a standard deviation of 32.2 ft-lb, which represents a 33.7% improvement over untreated.

A second solution was prepared as in Example 8, except that the entire quantity of polymer (0.32 g of EC-1791) was removed. The ring on ring test gave a result of 116.0 ft-lb with a standard deviation of 37.0 ft-lb, which represents a 10.1% improvement over untreated.

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

What is claimed is:

1. A composition for strengthening glass comprising micro defects or micro cracks in a surface of the glass, the composition consisting essentially of:
   a plurality of functionalized polymer colloid particles without carbon nanotubes;
   wherein the plurality of functionalized colloid particles comprises the reaction product of a bi-functional organosilicon compound without carbon nanotubes, the compound having a first functional group and a second functional group; an acrylic polymer; a polyol; a preservative; a homogenized defoamer, no defoamer, or polypropylene glycol; and an aqueous solvent;
   wherein the first functional group of the bi-functional organosilicon compound is reacted with the acrylic polymer to form the plurality of functionalized polymer colloid particles, wherein the plurality of functionalized polymer colloid particles have an average diameter of about 200 nm to about 800 nm as measured by dynamic light scattering (DLS) and are capable of strengthening the glass without creating a silica coating by filling micro defects or micro cracks in the surface of the glass when the composition is applied onto the surface of the glass; and
   wherein the second functional group of the bi-functional organosilicon compound is capable of reacting with the surface of the micro defects or micro cracks in the glass to anchor the plurality of functionalized polymer colloid particles thereto.

2. The composition of claim 1, wherein the bi-functional organosilicon compound is an alkoxysilane.

3. The composition of claim 2, wherein the alkoxysilane is (3-glycidoxypropyl)trimethoxysilane, (3-aminopropyl)trimethoxysilane, or (3-glycidoxypropyl)methyldiethoxysilane.

4. The composition of claim 1, wherein the polyol is glycerol.

5. The composition of claim 1, wherein the solvent comprises a mixture of water and an alcohol.

6. The composition of claim 5, wherein the alcohol is isopropyl alcohol.

7. The composition of claim 1, wherein the preservative is a carboxylic acid.

8. The composition of claim 7, wherein the carboxylic acid is benzoic acid.

9. The composition of claim 1, wherein the acrylic polymer comprises at least one of poly(methyl methacrylate), sodium polyacrylate, and polyacrylamide.

10. The composition of claim 1, wherein the functionalized polymer colloid particles are formed through physical manipulation of the composition.

11. The composition of claim 10, wherein the physical manipulation comprises stirring or sonication.

12. The composition of claim 1, wherein the polypropylene glycol has a molecular weight of about 425 g/mol to about 1200 g/mol.

13. A method for strengthening glass comprising micro defects or micro cracks in a surface of the glass, the method comprising:
   providing a composition for strengthening the glass comprising micro defects or micro cracks in the surface of the glass, the composition consisting essentially of:

a plurality of functionalized polymer colloid particles without carbon nanotubes;

wherein the plurality of functionalized colloid particles comprises the reaction product of a bi-functional organosilicon compound without carbon nanotubes, the compound having a first functional group and a second functional group; an acrylic polymer; a polyol; a preservative; a homogenized defoamer, no defoamer, or polypropylene glycol; and an aqueous solvent;

wherein the first functional group of the bi-functional organosilicon compound is reacted with the acrylic polymer to form the plurality of functionalized polymer colloid particles, wherein the plurality of functionalized polymer colloid particles have an average diameter of about 200 nm to about 800 nm as measured by dynamic light scattering (DLS) and are capable of strengthening the glass without creating a silica coating by filling micro defects or micro cracks in the surface of the glass when the composition is applied onto the surface of the glass;

and wherein the second functional group of the bi-functional organosilicon compound is capable of reacting with the surface of the defects or cracks in the glass to anchor the plurality of functionalized polymer colloid particles thereto;

treating the glass surface with the micro defects or micro cracks with the composition for strengthening the glass by spreading, spraying, dipping, spin coating, casting, roll coating, extrusion coating, knife coating, thermal spraying, web coating, or electrophoresis; and evaporating the aqueous solvent to leave the plurality of functionalized polymer colloid particles in the micro defects or micro cracks on the surface of the glass.

14. The method of claim 13, wherein evaporating the aqueous solvent comprises heating the glass with an external heat source.

15. The method of claim 14, wherein the external heat source comprises an infrared heat source or an ultraviolet radiation heat source.

* * * * *